United States Patent
Morgan

[19]

[11] Patent Number: 5,918,756
[45] Date of Patent: Jul. 6, 1999

[54] VESSEL LOCK DOWN SYSTEM

[76] Inventor: H. William Morgan, P.O. Box 735, Michigan City, Ind. 46361

[21] Appl. No.: 08/841,155

[22] Filed: Apr. 29, 1997

[51] Int. Cl.$^6$ .............................. B65D 43/26; B65D 41/06
[52] U.S. Cl. ........................... 220/263; 220/291; 220/833; 49/149; 49/324
[58] Field of Search ...................................... 220/581, 582, 220/262, 263, 912, 291, 315, 303, 304, 293, 295, 296, 298, 300, 329, 331, 833, 835; 49/149, 324

[56] References Cited

U.S. PATENT DOCUMENTS

| | | | |
|---|---|---|---|
| 2,583,073 | 1/1952 | Ahlborn | 220/291 |
| 3,488,883 | 1/1970 | Clements et al. | 220/291 X |
| 4,102,473 | 7/1978 | Draxler | 220/295 X |
| 4,381,879 | 5/1983 | Ehrenfels et al. | 220/291 X |
| 5,143,389 | 9/1992 | Jonkers | 220/300 X |

FOREIGN PATENT DOCUMENTS

| | | | |
|---|---|---|---|
| 1338183 | 8/1963 | France | 220/262 |
| 1065323 | 1/1958 | Germany | 220/291 |
| 1625988 | 8/1970 | Germany | 220/262 |
| 188498 | 3/1939 | Switzerland | 220/291 |

*Primary Examiner*—Stephen K. Cronin
*Assistant Examiner*—Nathan Newhouse
*Attorney, Agent, or Firm*—Baker & Daniels

[57] ABSTRACT

A pressure vessel according to the present invention includes a housing with a cylindrical upper portion having a plurality of radially extending catch members on its circumference and a lid for mating with the housing with a cylindrical side edge having a plurality of hook-shaped retaining members spaced about its circumference to correspond with the catch members. A control system operates a lift to lower the lid onto the housing. A drive cylinder connected between the lid and the housing is then enabled to rotate the lid relative to the housing about its central axis between a locked position and an unlocked position. Spacers mounted to the inner surfaces of the retaining members act as bearings, guiding the lid as it rotates. As the lid rotates toward its locked position, finger portions of the retaining members cam into underlocking engagement with the catch members to draw the lid onto the housing. The control system disables the vessel by operating the drive cylinder in the reverse direction and then operating the lift to lift the lid from the housing.

22 Claims, 10 Drawing Sheets

VESSEL LOCK DOWN SYSTEM

BACKGROUND OF THE INVENTION

Heretofore, large pressurized filtering vessels, and other vessels for containing pressurized media, have typically employed eye bolt lid attachment systems. Such conventional systems include a plurality of bolt fasteners pivotally mounted to the rim of the vessel housing at spaced intervals. The number and spacing of the fasteners is usually a function of the pressure rating for the vessel. When the lid is placed onto the housing, the bolts are pivoted upwardly into corresponding U-shaped brackets formed around the periphery of the lid. A nut is screwed onto the exposed shank portion of each bolt fastener and against the bracket to hold secure the lid to the housing. This fastening method is tedious and time consuming. Furthermore, it is known that substantially uniform clamping pressure about the circumference of the lid is desirable. Thus, the torque applied to each nut must be checked to assure that uniform clamping pressure is applied between the lid and the housing.

Other conventional lid attachment systems employ a variety of specially formed lid perimeters and housing lock rings which cooperatively engage to secure the lid to the housing when the lid is rotated relative to the housing. Some of these quick close configurations include, for example, a plurality of downwardly projecting tabs with upturned outer ends inset from the outer edge of the lid which, when the lid is rotated, engage a plurality of cam surfaces formed into slots in the side wall of the housing. Other quick close configurations employ a plurality of spaced lugs which extend outwardly from the side edge of the lid, and a plurality of similarly spaced cams which extend inwardly from a lock ring attached to the top of the housing side wall. When the lid is rotated within the lock ring, the lugs coact with the internal cams to secure the lid to the vessel housing. These systems, however, require precision machining of the vessel housing and lid to ensure an adequate seal. Thus, such conventional systems are generally expensive and difficult to manufacture and assemble.

SUMMARY OF THE INVENTION

The present invention is a lock down system for a pressurized filtering vessel which provides an inexpensive, simple system for locking the vessel lid to the housing. The vessel housing preferably carries a davit arm which extends over the vessel and supports a lift piston which is pivotally connected to lid. The housing includes an upper cylindrical portion which engages the lower cylindrical side edge of the lid. A plurality of radially extending catch members are disposed at intervals about the housing cylindrical portion. A corresponding plurality of hook-shaped retaining members extend downwardly from the lid side edge to overlie the cylindrical portion of the housing when the lid is lowered onto the housing. Once the lid is situated on the housing, a drive mounted between the housing and the lid is activated to cause the lid to rotate with the retaining members engaging the catch members, drawing the lid downwardly onto the housing. The lid is removed by reversing the direction of the drive and operating the lift piston to raise the lid from the housing.

Accordingly, it is an object of the present invention to provide a vessel lock down system for a pressurized vessel which quickly attaches and detaches the lid to the vessel housing.

Another object of the invention is to provide a vessel lock down system for a pressurized vessel which provides uniform compressive force between the lid and housing around the circumference of the lid.

Yet another object of the present invention is to provide a lock down system for a pressurized vessel which attaches to the exterior of the vessel housing and lid.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE INVENTION

The embodiments disclosed below are not intended to be exhaustive or to limit the invention to the precise forms disclosed in the following detailed description. Rather, the embodiments are chosen and described so that others skilled in the art may utilize their teachings.

Figure 1:
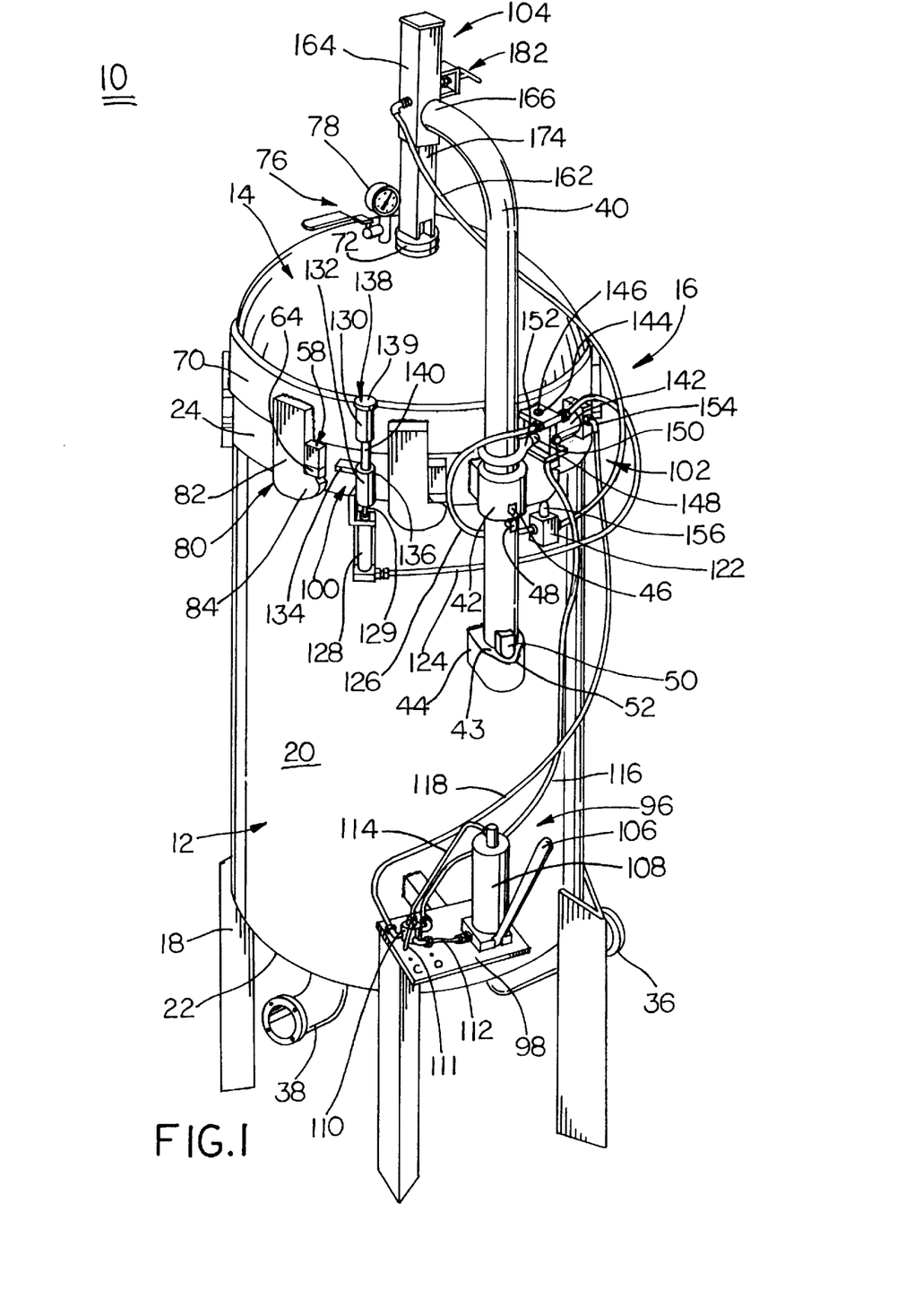
FIG. 1 is a perspective view of the present pressure vessel lock down system.
Figure 2:
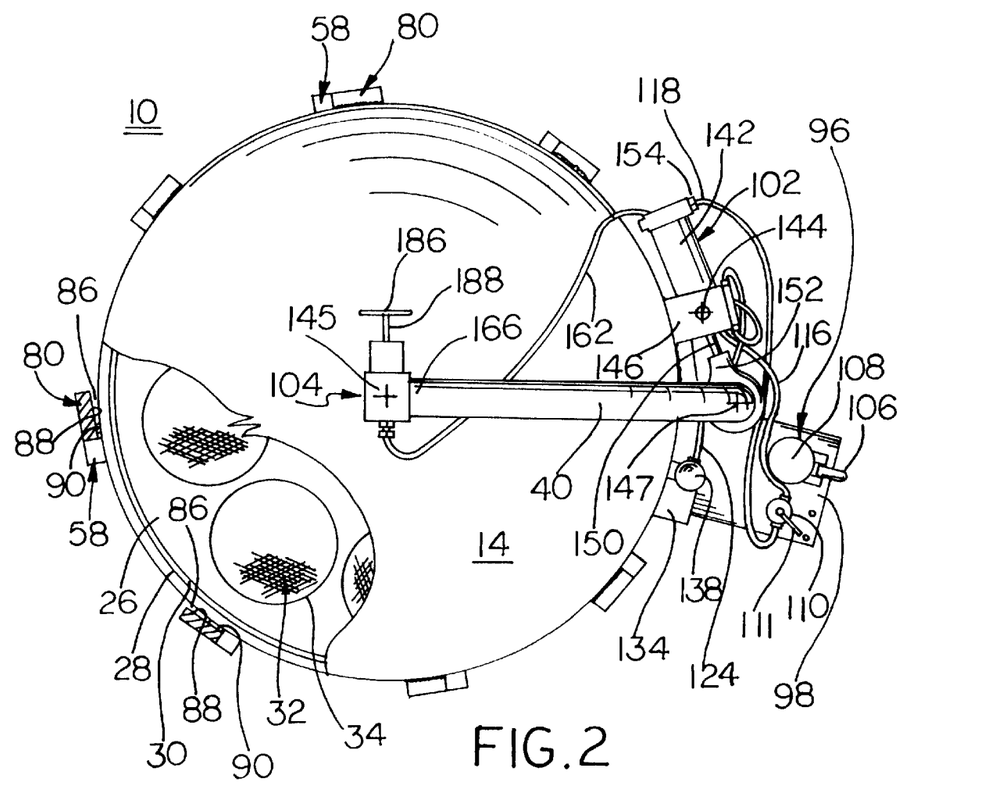
FIG. 2 is a fragmented top plan view of the system of FIG. 1.
Figure 3:
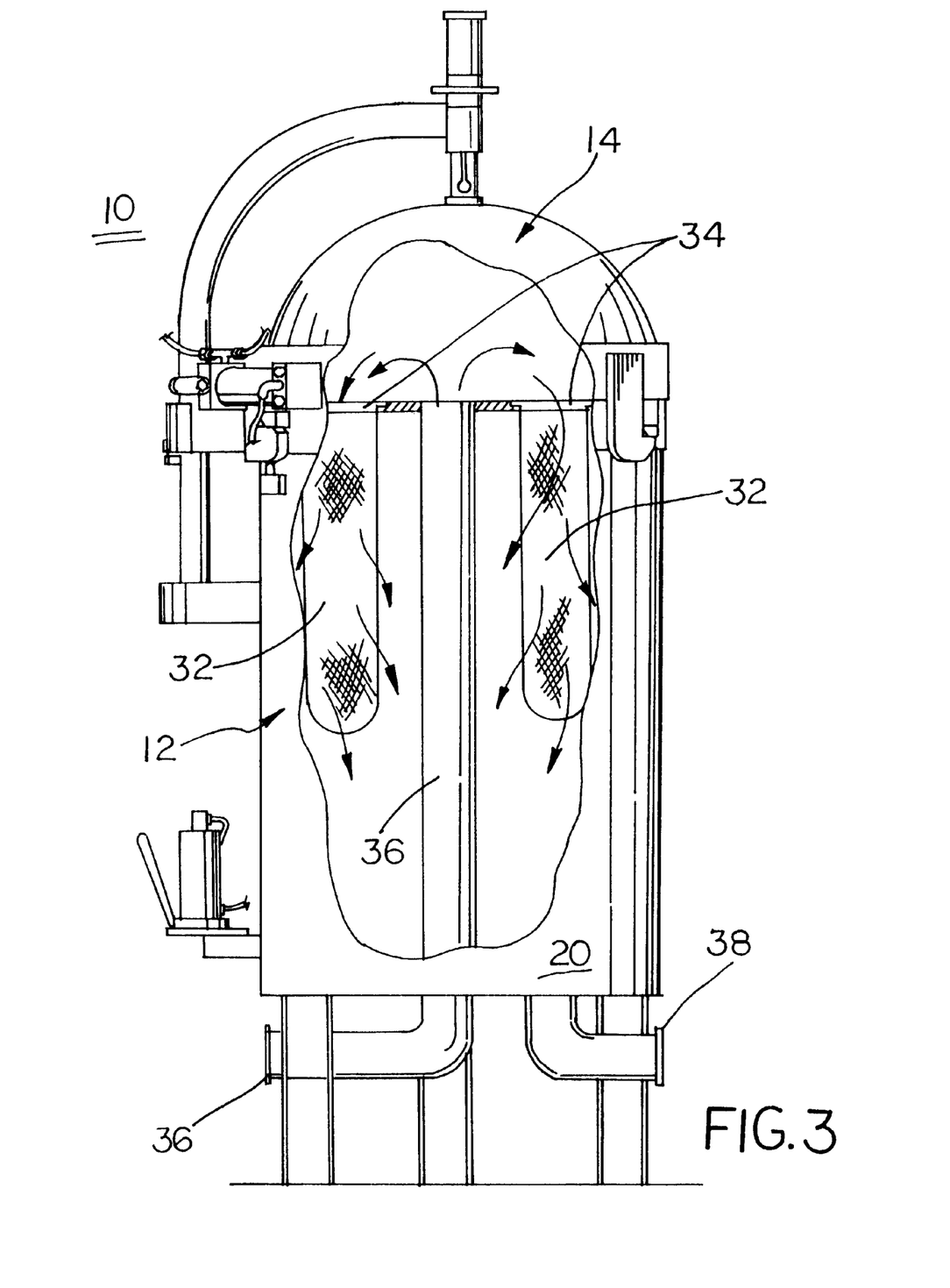
FIG. 3 is a fragmented side elevational view of a pressurized filtering vessel according to the present invention showing the flow of liquid media for filtering.

Referring now to FIGS. 1 and 2, the pressure vessel 10 of the present invention generally includes a body or housing 12, a lid 14, and a pneumatic actuation or control system 16. Housing 12 is supported by legs 18 and includes a cylindrical side wall 20, a bottom wall 22, and an upper cylindrical portion 24 having a top wall 26. Top wall 26 has a circular groove 28 about its periphery which receives a hollow O-ring 30 to provide the seal between lid 14 and housing 12. In an exemplary embodiment, O-ring 30 is self-energizing and permits approximately 90% compression under the weight of lid 14. A plurality of filter bags 32 for filtering the liquid medium pumped through pressure vessel 10 are supported within filtration openings 34 formed in wall 26 of the housing 12. As best shown in FIG. 3, an inlet pipe 36 delivers the liquid medium to the filtration openings 34 above wall 26 and an outlet pipe 38 routes the filtered liquid below wall 26 out of vessel 10.

A davit arm 40 is pivotally supported by an upper sleeve bracket 42 and a lower sleeve bracket 44. Davit arm 40 extends vertically along housing side wall 20 and bends inwardly to terminate above housing 12 at the center of vessel 10. An alignment marker 46 is placed on upper sleeve bracket 42 to align with a marker 48 carried upon the davit arm 40 to provide a visual indication of the center position of davit arm 40 over the vessel. A generally V-shaped cam 50 is mounted on arm 40 and a generally V-shaped cam follower 52 is formed in lower sleeve bracket 44. When davit arm 40 is in its center position, the cam 50 extends into follower 52 of lower sleeve bracket 44 to center and support the arm with lid 14 aligned over housing 12. Arm 40 is axially shiftable as well as rotatable within brackets 42 and 44. As the open lid and arm are rotated into the broken line position shown in FIG. 11, cam 50 will slide upwardly over follower 52 onto the flat 43 of bracket 44. As arm 40 and open lid 14 are swung into the solid line position of FIG. 11, cam 50 will slide downwardly along follower 52 until in its centered position, thereby self-centering the lid over housing 12.

Figure 4:
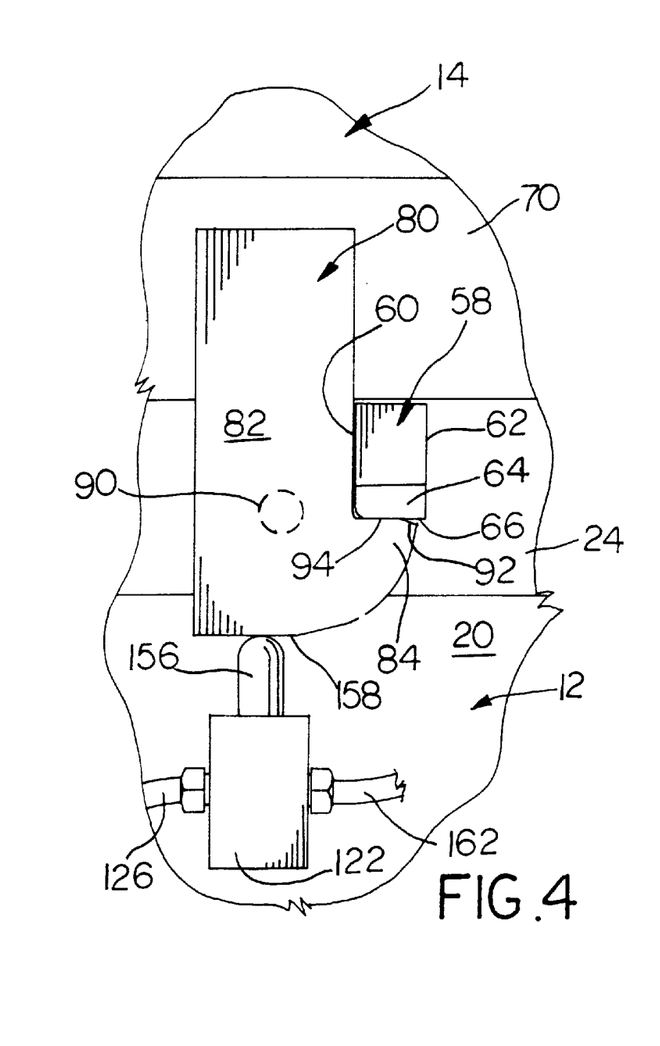
FIG. 4 is a fragmented side elevational view of the interlocking members of the present invention in a locked position.
Figure 5:
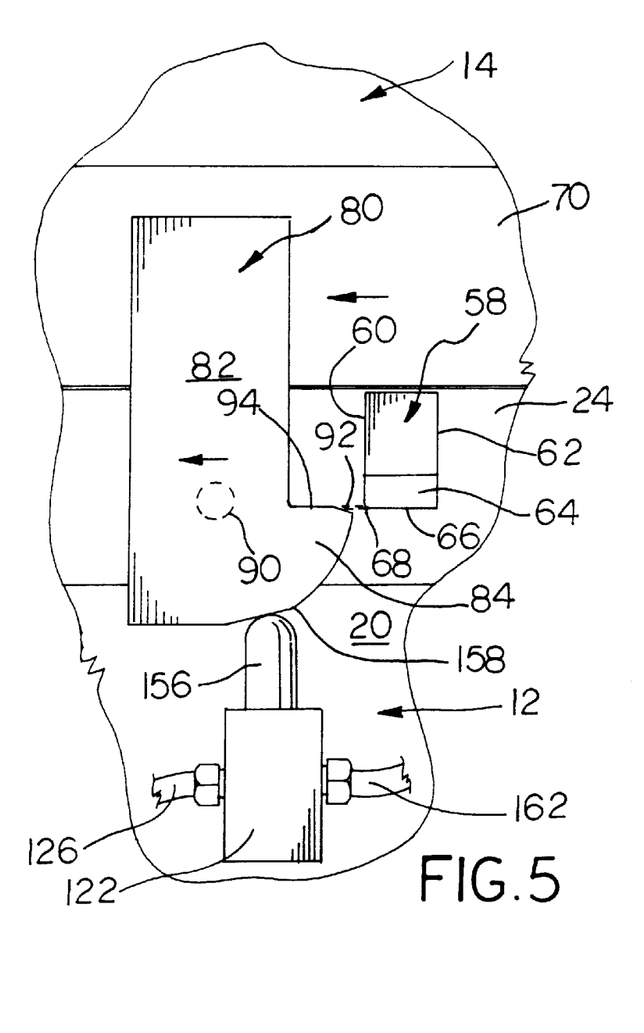
FIG. 5 is a view similar to FIG. 4 showing the interlocking members in an unlocked position.

A plurality of lugs or catch members 58 are attached, such as by welding, to the outer surface of cylindrical portion 24. As best shown in FIGS. 4 and 5, catch members 58 include side walls 60, 62 and a wear plate 64 which includes a planar catch surface 66 and an inclined cam surface 68. Catch members 58 are spaced at substantially equal angular intervals about cylindrical portion 24 and positioned such that all catch surfaces 66 are in a plane which is substantially parallel to top wall 26 of the housing.

Lid 14 includes a cylindrical side edge 70 forming a rim which is adapted to rest upon cylindrical portion 24 of vessel housing 12. A swivel joint 72 is mounted exteriorly to the center of lid 14. A conventional venting device 76 with a pressure gauge 78 is attached to lid 14 for venting the pressure within vessel 10.

A plurality of hook-shaped retaining members 80, each having a body 82 and a finger 84, are attached, such as by welding, to lid side edge 70 in spaced angular intervals corresponding to the spacing of catch members 58 attached to housing 12. Side edge 70 of lid 14 is slightly greater in diameter than cylindrical portion 24 of housing 12, and thus a gap 86 is formed between cylindrical portion 24 and the inner surface 88 of each retaining member 80 when the lid is lowered onto mating surface 26. A spacer 90, formed of bronze or other similar material, forms a part of each retaining member 80 at its inner surface 88. Each spacer 90 is locatable with slight clearance within the gap 86 between housing 12 and retaining member inner surface 88. (See FIGS. 2, 4 and 5). As should be apparent, instead of using a lid with an increased diameter side edge 70 to provide gaps 86, body 82 of each retaining member 80 could be formed with an offset section for attachment to side edge 70. Each retaining member finger 84 has an inclined cam surface 92 and an upper engagement surface 94 for engaging the catch surface 66 of a corresponding adjacent catch member 58.

Pneumatic control system 16 includes a pump 96 mounted on a table 98 attached to housing 12, a safety lock 100, a drive assembly 102 for rotating lid 14, and a lift 104 for raising and lowering lid 14. Pump 96 is actuated by a pumping lever arm 106 which pressurizes hydraulic fluid contained in the cylindrical body 108 according to principles well known in the art. Cylinder body 108 is connected to a two-position main valve 110 through a pair of feed lines 112, 114. A pair of feed hoses 116, 118 extend from main valve 110 to opposite ends of the body of cylinder 142 which forms a part of drive assembly 102. The forward fluid inlet of cylinder 142 communicates with safety lock 100 and a lift enable valve 122 through a lock supply line 124 and a hose 126, respectively.

Safety lock 100 includes a cylinder 128 which has its inlet in communication with lock supply line 124 and which is mounted to housing side wall 20 below a pair of vertically aligned collars. An upper collar 130 is attached to side edge 70 and a lower collar 132 is attached to cylindrical portion 24. Collars 130 and 132 are aligned when the lid 14 is in its locked position. A horizontal shelf 134 extends from and has its upper surface level with the top edge 136 of lower collar 132. A lock pin 138 extends slidably through upper collar 130 into lower collar 132 when lid 14 is in its locked position. Lock pin 138 includes an enlarged head 139 which prevents the pin from passing through the collar and an indicator shaft 140 which provides a visual indication of the position of the lock pin. The piston rod 129 of cylinder 128 is spring biased into a normal, retracted position.

Drive assembly 102 includes a cylinder 142 supported by a pivot pin 144 which extends through one end of the cylinder and a pair of flanges 146, 148 mounted to the lid side edge 70. The piston rod 150 of cylinder 142 is connected to an eyelet 152 which extends freely about davit arm 40. Feed hoses 116, 118 extend from cylinder 142 to a main valve 110 operable by moving a valve lever 111.

As best shown in FIGS. 4 and 5, lift enable valve 122 includes an actuator pin 156 which opens the valve when extended and closes the valve when retracted. Pin 156 is spring biased upwardly for engagement with a cam surface 158 which is formed by the leading lower edge of the adjacent retaining member 80. When opened, lift enable valve 122 passes fluid from hose 126 to lift piston supply line 162.

Figure 6:
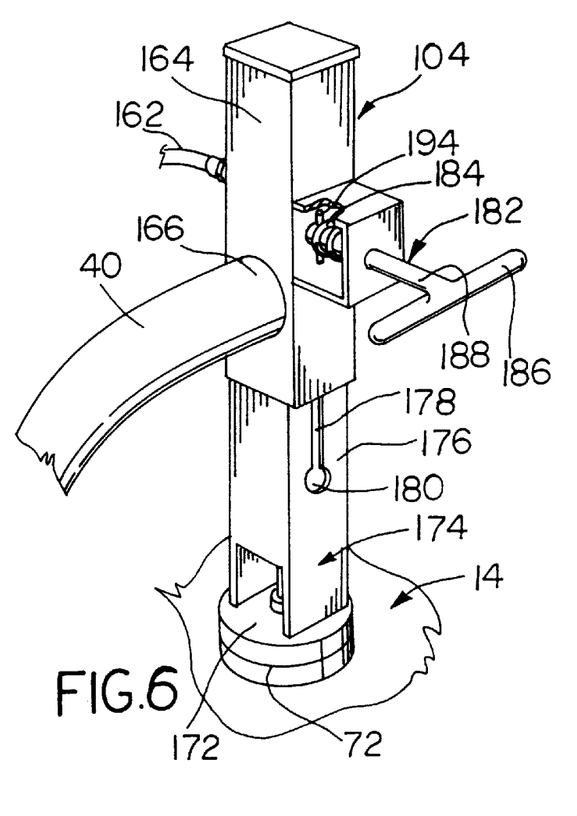
FIG. 6 is a fragmented perspective view of the lift piston of the present invention.
Figure 7:
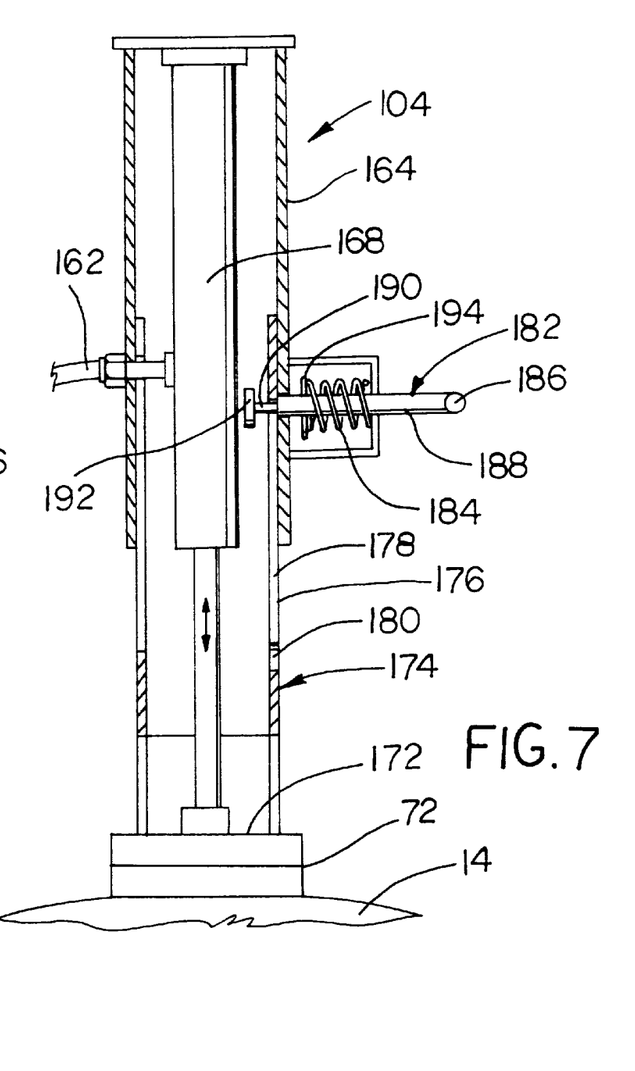
FIG. 7 is a partially sectionalized, fragmented side elevational view of the lift piston of FIG. 6.

Referring now to FIGS. 6 and 7, lift 104 includes an outer tube 164 which is connected to end 166 of davit arm 40 over the center of lid 14 and an inner tube 174 reciprocally housed within tube 164. Tube 174 is connected to lid 14 at swivel joint 72 which allows the lid to rotate relative to tubes 164, 174 and arm 40. A cylinder 168, which is actuated by pressurized fluid from supply line 162, is attached between tube 164 and swivel 72. Actuation of cylinder 168 causes the retraction and extension of tubes 164, 174 and the lifting and dropping of lid 14. One wall 176 of tube 174 has formed in it a longitudinal slot 178 with a key hole 180 at its lower end. A catch pin 182 is exteriorly mounted to tube 164 and biased inwardly by a spring 184 which abuts in compression a dowel pin 194 extending through the pin. Catch pin 182 includes a handle 186, a body 188, a neck part 190, and a head 192. Body 188 extends with clearance through a wall of tube 164 with neck part 190 extending with slight clearance in slot 178 as inner tube 174 is raised or lowered within tube 164. The shoulder of body 188 at neck part 190 abuts wall 176 as neck part 190 fits within slot 178. The inward travel of catch pin 182 is limited by dowel pin 194. Body 188 is biased into key hole 180 when retractable member 174 (and lid 14) is fully raised relative to housing 12 to form a stop.

MODE OF OPERATION

Figure 8:
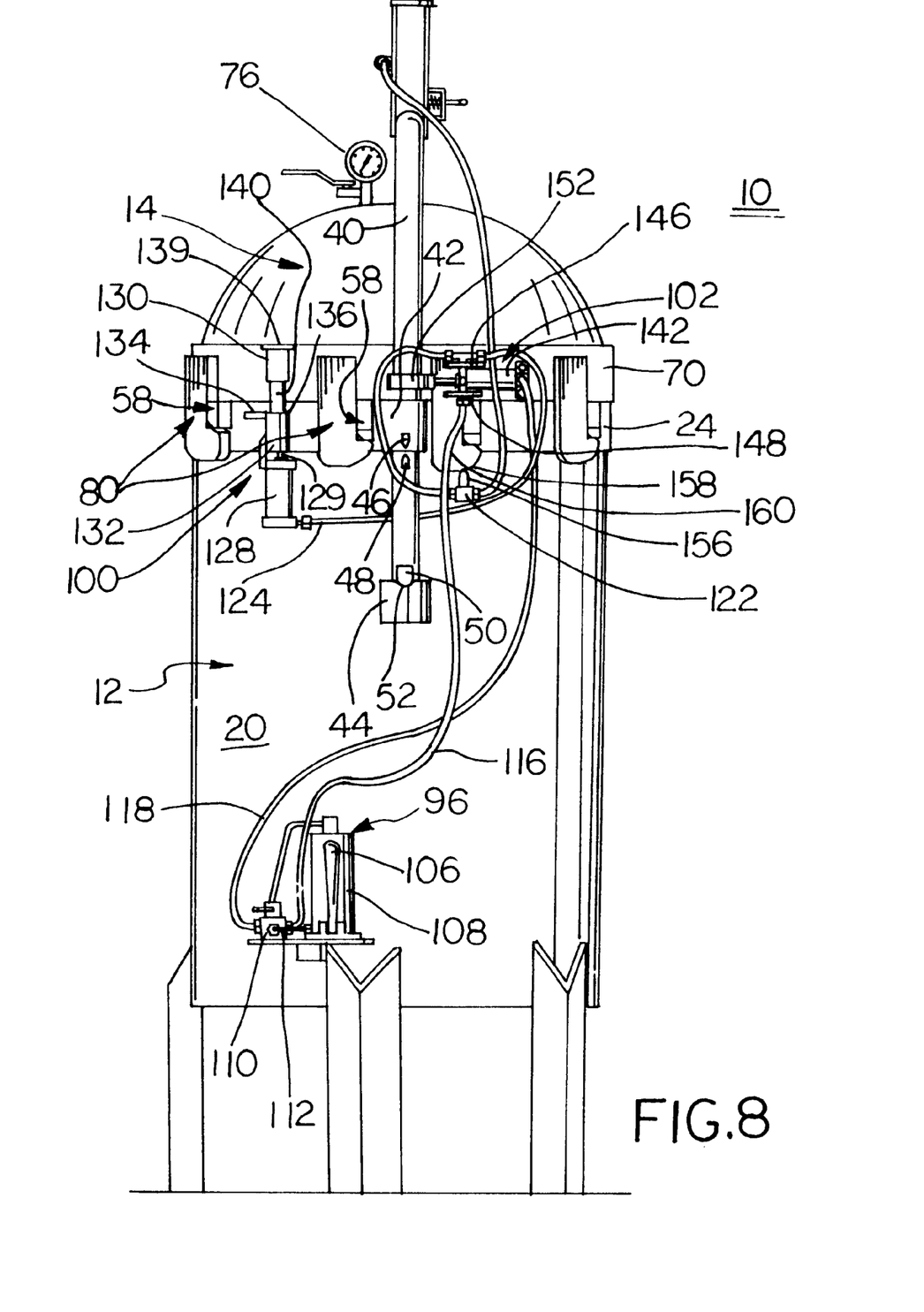
FIG. 8 is a side elevational view of the present pressure vessel lock down system showing the vessel lid in a locked position.

Beginning from a locked, closed position as shown in FIG. 8, pressure vessel 10 is disabled (unlocked and opened)

as follows. An operator vents any pressure internal to vessel 10 by operating venting device 76. Then the operator switches main valve 110 to the "open" position connecting hose 116 to the reservoir of the pump 96, and operates pump 96 with manual lever arm 106. The hydraulic fluid within reservoir 108 is forced under pressure through feed line 112 to main valve 110. Fluid from main valve 110 is communicated through feed hose 116 to the forward fluid inlet of cylinder 142, lift enable valve 122, safety lock 100 through line 124, and hose 126. According to principles well known in the art, as the pressure builds with continued pumping of lever arm 106, the fluid follows the path of least resistance. Since lift enable valve 122 is closed due to the position of actuator pin 156 on retaining member cam surface 158 and the pressure required to operate cylinder 128 is substantially less than the pressure required to retract cylinder 142 (i.e., shiftably rotate lid 14 clockwise), the fluid in line 124 forces cylinder 128 upwardly into lower collar 132. Cylinder 128 extends to just slightly above top edge 136 of lower collar 132, thereby pushing lock pin 138 upwardly to expose a red (or otherwise warning color-coded) segment of indicator shaft 140 between upper collar 130 and lower collar 132 to indicate that vessel 10 is disabled and should not be operated.

Figure 9:
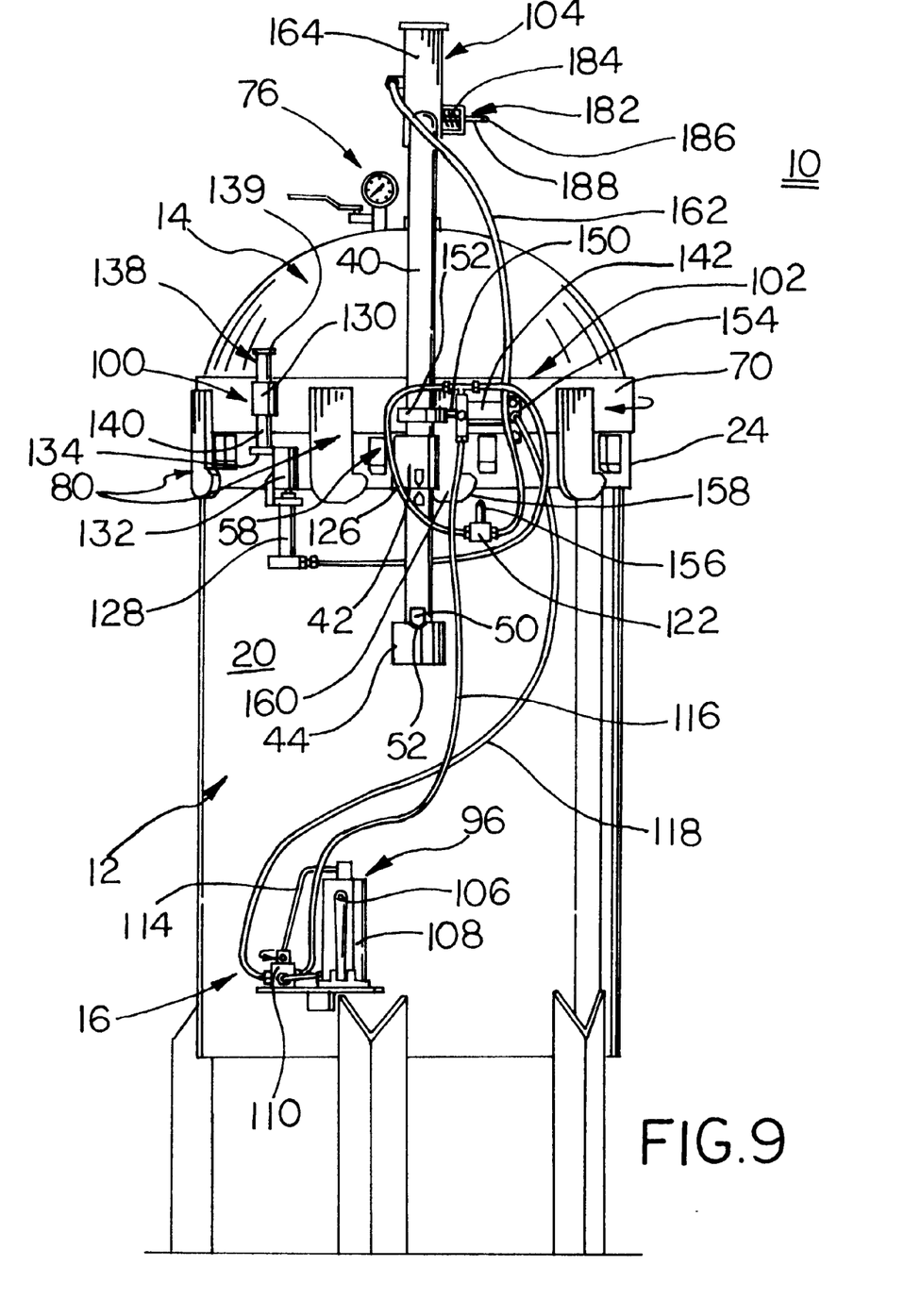
FIG. 9 is a view similar to FIG. 8 showing the vessel lid in an unlocked position.

Referring now to FIG. 9, as fluid pressure continues to build within cylinder 142 at its forward inlet where hose 116 is connected to the cylinder, the cylinder is drawn toward rod eyelet 152 about davit arm 40, thereby causing the rotation of lid 14 about its general central axis 145 through the center of housing 12. As lid 14 rotates, retaining members 80 become disengaged from catch members 58. As more specifically shown in FIG. 5, engagement surfaces 94 of retaining member fingers 84 shift clockwise relative to catch surfaces 66 of catch members 58. As inclined cam surfaces 92 of retaining members 80 follow inclined cam surfaces 68 of catch members 58, lid 14 preferably moves up slightly relative to housing 12 as O-ring 30 responds to the reduced compressive force.

Figure 10:
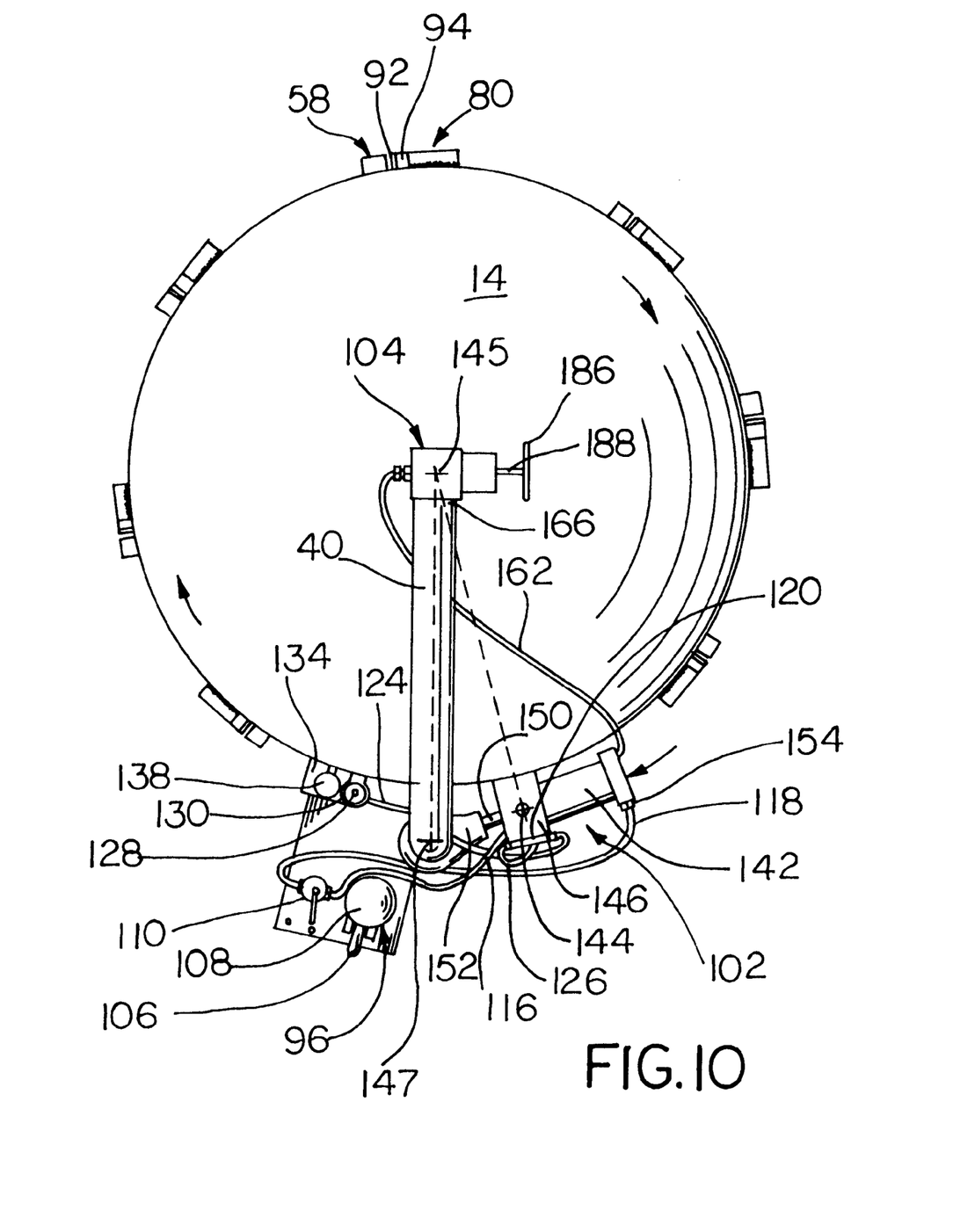
FIG. 10 is a top plan view of the system shown in FIG. 9.

FIG. 2 (showing lid 14 in its locked position) and FIG. 10 (showing lid 14 in its unlocked position) are illustrative of the range through which drive assembly 102 rotates lid 14 relative to housing 12. As cylinder 142 retracts, it pivots slightly about pivot pin 144 and eyelet 152 pivots slightly about davit arm 40 which constitutes a second pivot point 147. The distance from pivot pin 144 and central axis 145 of lid 14 is generally equivalent to the distance from pivot point 147 and central axis 145 (see FIG. 10). Spacers 90 prevent binding misalignment between lid 14 and housing 12 and serve to guide lid 14 through its rotation.

As lid 14 rotates to its unlocked position, lock pin 138 rides off of raised rod 129 and onto outer shelf 134. At the same time, pin 156 of lift enable valve 122 follows cam surface 158 of the adjacent retaining member 80. As retaining member 80 moves further clockwise relative to pin 156 due to the rotation of lid 14, pin 156 moves further upwardly along cam surface 158 until it reaches its fully extended position (see FIG. 9). This opens lift enable valve 122 and allows fluid to pass through hose 126 and line 162 to cylinder 168 of lift 104.

Figure 11:
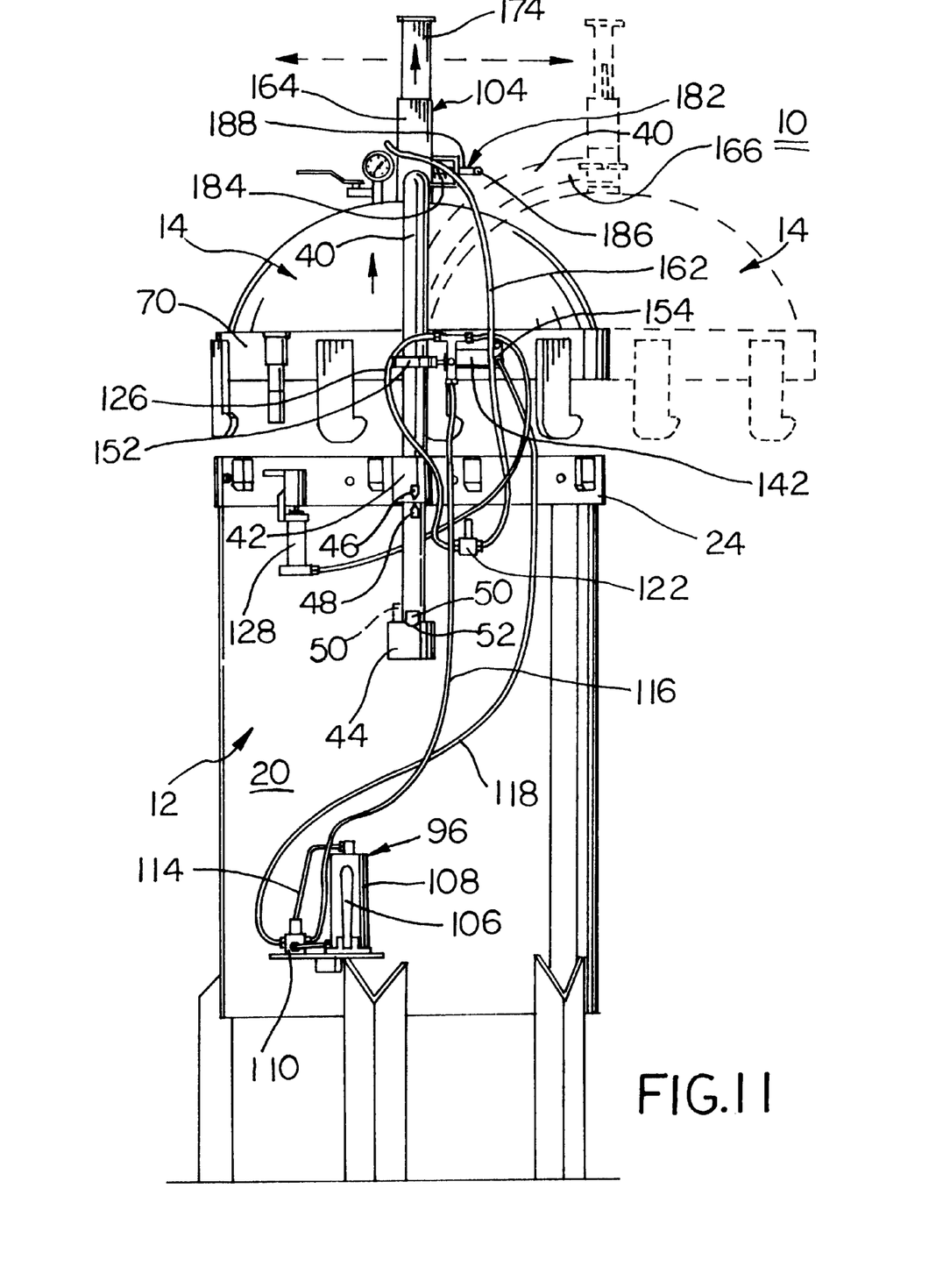
FIG. 11 is a view similar to FIG. 9 showing the vessel lid in an opened position.

Once rod 129 is fully extended and cylinder 142 is fully retracted, further pumping of pump lever arm 106 forces fluid through hose 126 and line 162 to operate cylinder 168, thereby causing inner tube 174 to be drawn upwardly into tube 164. As tube 174 is drawn into tube 164, it carries lid 14 upwardly along axis 145 from its unlocked, closed position as shown in FIG. 9, to its unlocked, raised and opened position as shown in FIG. 11. As lid 14 is raised, eyelet 152 slides upwardly along davit arm 40. When lid 14 is raised to its fully opened position, body 188 of catch pin 182 snaps into key hole 180 in side wall 176 under force of spring 184 to secure and lock the lid 14 in its raised position. The filter bags 32 within the housing 12 may be accessed by swinging lid 14 laterally (as shown in dotted lines in FIG. 11) whereby davit arm 40 pivots within upper sleeve bracket 42 and lower sleeve bracket 44.

After the vessel housing 12 has been accessed for maintenance, cleaning, etc., pressure vessel 10 is enabled for further operation as follows. Lid 14 is first swung back into its suspended position over housing 12. As lid 14 is rotated laterally about pivot point 147 into alignment with housing cylindrical portion 24, cam 50 carried by arm 40 will slide over and downwardly along follower 52 of lower bracket 44 to center the lid over the housing.

Next, pump lever arm 106 is pumped a few times to relieve any downward force applied to catch pin 182 by the weight of lid 14. Catch pin 182 is then pulled outwardly from key hole 180 using handle 186 and main valve 110 is moved to the "closed" position. As should be apparent, catch pin 182 could readily be modified for automated, push-button operation. With valve 110 in its closed position, hose 116 and line 114 are placed in communication and hose 118 and feed line 112 are placed in communication. The weight of released lid 14 forces fluid from lift cylinder 168 as its piston in extended, through supply line 162, open lift enable valve 122, line 126, hose 116, main valve 110, and feed line 114 into cylinder body 108. As inner tube 174 shifts downwardly through outer tube 164, neck part 190 of catch pin 182 slides within slot 178 while pin body 188 slides along side wall 176 under the biasing force of spring 184. Lid 14 gradually lowers into contact with O-ring 28 with the weight of lid 14 substantially compressing O-ring 28 thereby providing a seal between lid 14 and top wall 26 of the housing.

With the lid 14 fully seated on housing 12, the operator pumps lever arm 106 with main valve 110 still in its closed position to force the fluid in cylinder body 108 through line 112 and hose 118 to rearward fluid inlet cylinder 142. This causes the cylinder body to extend from davit arm 40, thereby pulling lid 14 in a counter-clockwise direction about axis 145 relative to housing 12. As cam surfaces 92 of retaining members 80 engage cams 68 of catch members 58, lid 14 is drawn downwardly with retaining member engagement surfaces 94 contacting catch member catch surfaces 66 as shown in FIG. 4. Lid 14 is thereby drawn downwardly onto housing 12 further compressing O-ring 28 by an amount indicated by the dotted lines in FIG. 5. When the lid is being so shifted into its locked position, spacers 90 contact the cylindrical portion 24 of housing 12, thereby ensuring that cylinder 142 will travel its full stroke without binding interference between the lid and housing. As seen is FIG. 4, there is preferably a slight space between retaining member 80 and the side wall 60 of the adjacent catch member 58 when the lid is in its locked position.

As drive assembly 102 shifts lid 14 from its unlocked to its locked position, cam surface 158 of a retaining member 80 engages actuator pin 156 of lift enable valve 122 to urge the pin downwardly, thus closing the valve. Also, lock pin 138 of safety lock 100 is pulled across shelf 134 until lid 14 rotates upper collar 130 into alignment with lower collar 132. When the collars are so aligned, pin 138 drops under force of gravity into lower collar 132, as seen in FIG. 8, thereby exposing a green (or otherwise color-coded) segment of indicator shaft 140 between upper collar 130 and lower collar 132, indicating that vessel operation is permitted.

Figure 12:
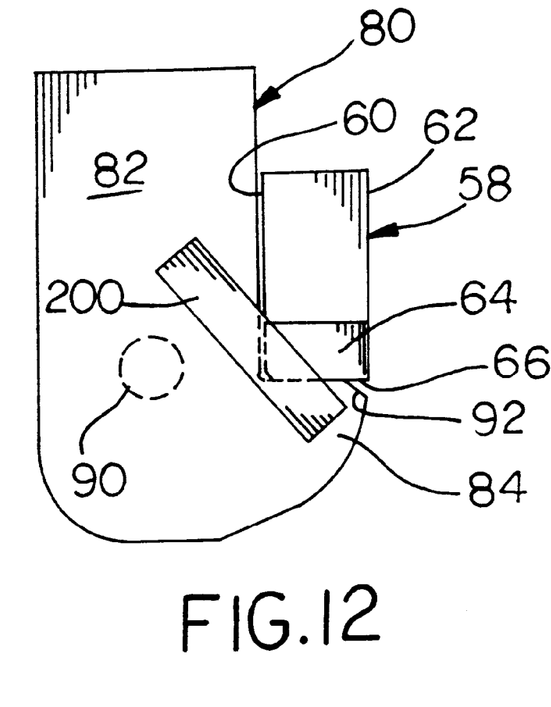
FIG. 12 is a side elevational view of an alternate embodiment of the interlocking members of the present invention.

FIG. 12 shows an alternate embodiment of retaining members 80 of the present invention. According to this embodiment, a strap 200 is attached, such as by welding, diagonally between finger 84 and body 82. Strap 200 reinforces the inside corner region of retaining member 80 against stresses resulting from high internal vessel pressures.

Figures 13, 14:
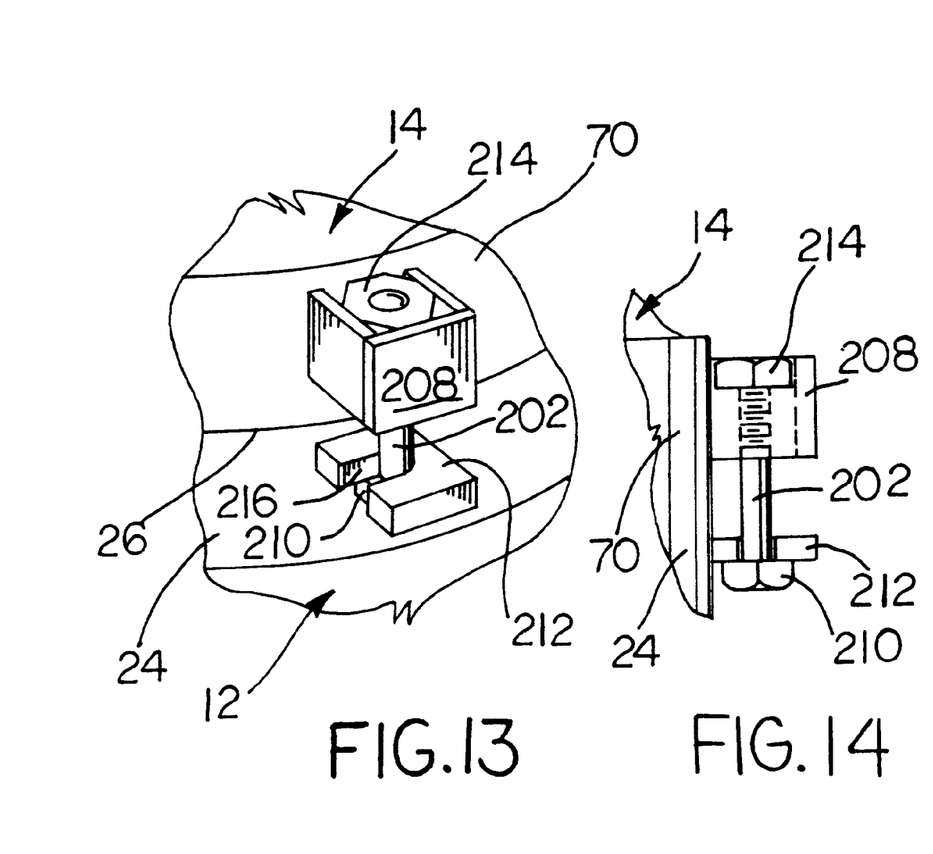
FIG. 13 is a fragmented perspective view of another embodiment of the interlocking members.
FIG. 14 is a fragmented side elevational view of the interlocking members of FIG. 13.

FIGS. 13 and 14 show an alternate embodiment of the retaining member 80/catch member 58 combination described above. In this configuration, each retaining member 80 is replaced by a standard bolt 202 and nut 214. Nut 214 is held by welding in a captive, horizontal position within a retainer box 208 connected to housing 14. Bolt 202 is screwed into nut 214 and extends vertically downwardly with its head 210 fitted under a notched bracket 212. To unlock lid, each bolt 202 is loosened. As lid 14 is rotated from its locked position to its unlocked position, each bolt 202 slides out of bracket 212 until its head 210 clears the bracket. Lid 14 may then be lifted. Alternately, bolts 202 may be fixedly secured to nuts 214 so that as lid 14 is rotated toward brackets 212, heads 210 of bolts 202 cam under brackets 212 to lock lid 14 to housing 12.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and fall within the scope of the appended claims.

What is claimed is:

1. A pressure vessel comprising:
   a housing including a side wall part defining an opening into the housing;
   a lid having a side edge part spanning said opening;
   a plurality of catch members externally connected to one of said housing and said lid;
   a plurality of retaining members externally connected to the other of said housing and said lid; and
   a drive assembly secured to said housing to engage said lid for rotatably shifting said lid relative to said housing between a locked position wherein said retaining members engage said catch members to releasably secure said lid to said housing and an unlocked position wherein said retaining members are disengaged from said catch members.

2. A pressure vessel according to claim 1 wherein said catch members are circumferentially spaced about said one part and said retaining members are circumferentially spaced about said other part.

3. A pressure vessel according to claim 1 wherein said catch members are connected to said side wall part and said retaining members are connected to said side edge part.

4. A pressure vessel according to claim 1 wherein said catch members each include a planar catch surface being substantially parallel the plane of rotation of said lid, said retaining members each including a body connected to said other part and a finger extending from said body, said finger including a planar engagement surface for engaging said catch surface when said lid is in said locked position.

5. A pressure vessel according to claim 4 wherein said engagement surface constitutes camming means for engagement with said catch surface as said lid is rotated into said locked position to draw said lid into compressive engagement with said housing.

6. A pressure vessel according to claim 1 wherein said drive assembly includes a stationary part connected to said housing and a movable part connected to said lid.

7. A pressure vessel according to claim 6 wherein said drive assembly includes a cylinder and extendable piston.

8. A pressure vessel according to claim 6 wherein each retaining member further constitutes means for guiding said shifting movement of said lid relative to said housing about a general vertical axis.

9. A pressure vessel according to claim 8 further comprising means for moving said lid vertically along said vertical axis between an opened position wherein said lid is spaced upwardly away from said housing and a closed position wherein said lid engages said housing.

10. A pressure vessel according to claim 9 wherein said moving means includes an outer tube supported above said lid for retractably receiving an inner tube connected to said lid at said vertical axis, and a catch pin for interlocking with said inner tube to secure said inner tube relative to said outer tube when said lid is moved to said opened position.

11. A pressure vessel according to claim 10 wherein said inner tube includes a side wall defining a key hole, said catch pin extending through said outer tube into said key hole when said lid is moved to said opened position.

12. A pressure vessel according to claim 9 wherein said moving means includes a support lift arm having one end pivotally connected to said housing and another end connected to said lid whereby the lid can be shifted away from said housing when the lid is in its said opened position.

13. A pressure vessel according to claim 8 wherein said stationary part is pivotally connected about a first axis to said housing and said movable part is pivotally connected about a second axis to said lid, said first axis and said second axis being substantially equally spaced from said vertical axis.

14. A pressure vessel according to claim 1 further comprising lock means attached to said lid for engaging said housing when said lid is in said locked position to prevent said rotation of said lid.

15. A pressure vessel according to claim 14 further comprising means for moving said lid between an open position spaced from said housing and a closed position engaging said housing, and control means operably connected to said lock means and said moving means and said drive assembly for selectively enabling and disabling said pressure vessel, said control means disabling said vessel by sequentially disengaging said lock means to allow said rotation of said lid, then causing said drive means to shift said lid to said unlocked position, and then causing said moving means to move said lid to said opened position, said control means enabling said vessel by sequentially causing said moving means to move said lid to said closed position, then causing said drive means to shift said lid to said locked position, and then engaging said lock means to prevent said rotation of said lid.

16. A pressure vessel for housing a filtering device for filtering liquid medium passed therethrough, said vessel comprising:
   a substantially hollow body having a cylindrical portion defining a central opening, said cylindrical portion including a plurality of circumferentially spaced catch members extending radially outwardly therefrom;
   a lid having a cylindrical rim for aligning with said cylindrical portion, said rim including a plurality of circumferentially spaced retaining members to align with said catch members;
   means connected to said lid for positioning said lid between a closed position wherein said lid sealingly engages said body and an opened position wherein said lid is spaced away from said body; and rotation means secured to said body to engage said lid for rotatably shifting said lid relative to said body between an unlocked position wherein said retaining members are spaced away from said catch members and a locked position wherein said retaining members engage said catch members thereby releasably securing said lid to said body.

17. A pressure vessel according to claim 16 wherein each said catch member includes a planar catch surface being substantially parallel to the plane of rotation of said lid, each said retaining member including a planar engagement surface for engaging a respective said catch surface when said lid is in said locked position.

18. A pressure vessel according to claim 17 wherein said rotation means includes a stationary part connected to said housing and a movable part connected to said lid, said movable part being movable relative to said stationary part to shift said lid between said locked position and said unlocked position.

19. A pressure vessel according to claim 18 wherein said stationary part is pivotally connected to a first pivot point connected to said body and said movable part is pivotally connected to a second pivot point connected to said lid, said first and said second pivot points being substantially equidistantly spaced from the axis of rotation of said lid.

20. A pressure vessel according to claim 16 further comprising spacers attached to said retaining members for guiding said lid through said rotational shifting.

21. A pressure vessel according to claim 20 further comprising control means operably connected to said rotation means and said positioning means for operating said rotation means so that said lid is in said unlocked position before operating said positioning means and for operating said positioning means so that said lid is in said closed position before operating said rotation means.

22. A pressure vessel comprising:

a housing including a side wall part defining an opening into the housing;

a lid spanning said opening;

lock means securable upon rotation of said lid relative to said housing for locking said lid onto said housing spanning said housing opening in a locked position;

means for rotating said lid relative to said housing between said locked position and an unlocked position wherein said lid can be removed from said housing;

a first collar carried by said lid and a second collar carried by said housing, said first collar being alignable with said second collar when said lid is in its locked position;

a pin carried at all times by said first collar and extending into said second collar when said lid is in its locked position;

means carried by said housing for shifting said pin out of said second collar when said lid is in its locked position, said rotating means moving said lid from its said locked position to its said unlocked position after said pin is so shifted out of said second collar.

\* \* \* \* \*